US012415971B2

(12) United States Patent
Schoenherr et al.

(10) Patent No.: US 12,415,971 B2
(45) Date of Patent: Sep. 16, 2025

(54) GRANULES OF MGDA AND (METH)ACRYLIC ACID HOMO- OR CO-POLYMER; PROCESS FOR MAKING THE SAME

(71) Applicant: BASF SE, Ludwigshafen (DE)

(72) Inventors: Michael Schoenherr, Ludwigshafen (DE); Kati Schmidt, Ludwigshafen (DE); Johannes Felix Haus, Ludwigshafen (DE); Michael Klemens Mueller, Ludwigshafen (DE); Frank Jaekel, Ludwigshafen (DE); Marta Reinoso Garcia, Ludwigshafen (DE); Volker Klock, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 252 days.

(21) Appl. No.: 17/784,573

(22) PCT Filed: Dec. 1, 2020

(86) PCT No.: PCT/EP2020/084150

§ 371 (c)(1),
(2) Date: Jun. 10, 2022

(87) PCT Pub. No.: WO2021/115851

PCT Pub. Date: Jun. 17, 2021

(65) Prior Publication Data

US 2023/0025816 A1 Jan. 26, 2023

(30) Foreign Application Priority Data

Dec. 11, 2019 (EP) .................................... 19215218

(51) Int. Cl.

| | |
|---|---|
| ***C11D 11/00*** | (2006.01) |
| ***C11D 1/52*** | (2006.01) |
| ***C11D 3/20*** | (2006.01) |
| ***C11D 3/37*** | (2006.01) |
| ***C11D 3/38*** | (2006.01) |
| ***C11D 11/02*** | (2006.01) |

(52) U.S. Cl.
CPC .............. *C11D 3/2082* (2013.01); *C11D 1/52* (2013.01); *C11D 3/378* (2013.01); *C11D 11/02* (2013.01)

(58) Field of Classification Search
None
See application file for complete search history.

(56) References Cited

U.S. PATENT DOCUMENTS

2017/0058239 A1* 3/2017 Hartmann ............... C11D 11/02

FOREIGN PATENT DOCUMENTS

| | | | | |
|---|---|---|---|---|
| CN | 109415663 A | 3/2019 | | |
| DE | 10349388 A1 * | 6/2005 | ............. | C11D 11/02 |
| WO | 2009/103822 A1 | 8/2009 | | |
| WO | 2012/041741 A1 | 4/2012 | | |
| WO | 2012/168739 A1 | 12/2012 | | |
| WO | 2015/121170 A1 | 8/2015 | | |

OTHER PUBLICATIONS

WO 49121 English Translation (Year: 2000).*
European Search Report for EP Patent Application No. 19215218.9, Issued on Feb. 27, 2020, 3 pages.
International Search Report for PCT Patent Application No. PCT/EP2020/084150, Issued on Feb. 26, 2021, 3 pages.

* cited by examiner

*Primary Examiner* — Lorna M Douyon
(74) *Attorney, Agent, or Firm* — ArentFox Schiff LLP

(57) ABSTRACT

A process for making a granule containing (A) at least one chelating agent selected from alkali metal salts of methyl glycine diacetic acid (MGDA) and of iminodisuccinic acid (IDS), and, optionally, (B) at least one homo- or copolymer of (meth) acrylic acid, partially or fully neutralized with alkali, the process including the steps of (a) providing an aqueous solution or slurry containing chelating agent (A) and, if applicable, (co) polymer (B), (b) removing most of the water by spray granulation in a fluidized bed, (c) treating the resultant granule in a vessel of which at least one part rotates around a horizontal axis and wherein the vessel is selected from paddle mixers, free-fall mixers and plough share mixers.

9 Claims, No Drawings

GRANULES OF MGDA AND (METH)ACRYLIC ACID HOMO- OR CO-POLYMER; PROCESS FOR MAKING THE SAME

CROSS-REFERENCE TO RELATED APPLICATIONS

This application is a National Stage Entry of PCT/EP2020/084150, filed Dec. 1, 2020, which claims priority to EP application Ser. No. 19/215,218.9, filed Dec. 11, 2019, the disclosures of each of which are hereby incorporated by reference in their entirety.

The present invention is directed towards a process for making a granule containing (A) at least one chelating agent selected from alkali metal salts of methyl glycine diacetic acid (MGDA) and of iminodisuccinic acid (IDS), and, optionally, (B) at least one homo- or copolymer of (meth)acrylic acid, partially or fully neutralized with alkali, said process comprising the steps of (a) providing an aqueous solution or slurry containing chelating agent (A) and, if applicable, (co)polymer (B), (b) removing most of said water by spray granulation in a fluidized bed, (c) treating the resultant granule from step (b) with air or an inert gas in a vessel of which at least one part rotates around a horizontal axis and wherein said vessel is selected from paddle mixers, free-fall mixers and plough share mixers.

Chelating agents such as methyl glycine diacetic acid (MGDA) and their respective alkali metal salts are useful sequestrants for alkaline earth metal ions such as $Ca^{2+}$ and $Mg^{2+}$. For that reason, they are recommended and used for various purposes such as laundry detergents and for automatic dishwashing (ADW) formulations, in particular for so-called phosphate-free laundry detergents and phosphate-free ADW formulations. For shipping such chelating agents, in most cases either solids such as powders or granules are being applied or aqueous solutions.

Depending on the type of product—liquid home care and fabric care products versus solid home care and fabric care products—and the manufacturing process of solid home care and fabric care products care product manufacturers may either prefer to handle solutions of aminocarboxylates or solid aminocarboxylates, for example joint spray drying or solid mixing. Powders and granules of aminocarboxylates may be shipped economically due to their high active ingredient content that goes along with low water content. Therefore, convenient processes for providing granules are still of great commercial interest.

In WO 2009/103822, a process is disclosed in which slurries are granulated that have a certain solids content, with a gas inlet temperature of 120° C. or less.

In WO 2012/168739, a process is disclosed wherein slurries of complexing agents are spray-dried under non-agglomerating conditions.

In WO 2012/041741, a process is disclosed wherein solutions of complexing agents are dried using a spouted bed. However, up-scaling of spouted bed reactors is difficult.

Commonly ADW formulations contain up to 40% of MGDA builder and are packaged in single unit doses, in brief also “SUD”. The space in these SUD is limited and thus a higher bulk density is desired, because a higher bulk density allows for more active product per volume unit in these SUDs.

It was therefore an objective of the present invention to provide a process that yields granules of chelating agents with an increased bulk density and a reduced hygroscopicity. It was also an objective of the present invention to provide granules of chelating agents with an increased bulk density and a reduced hygroscopicity.

Accordingly, the process defined at the outset has been found, hereinafter also referred to as inventive process or as process according to the present invention. The inventive process comprises several steps that may be referred to as step (a) or step (b) or step (c). and that will be explained in more detail below.

The inventive process is a process for making a granule. The term “granule” in the context of the present invention refers to particulate materials that are solids at ambient temperature and that preferably have an average particle diameter (D50) in the range of from 0.1 mm to 2 mm, preferably 0.4 mm to 1.25 mm, even more preferably 400 μm to 1 mm. The average particle diameter of inventive granules can be determined, e.g., by optical or preferably by sieving methods. Sieves employed may have a mesh in the range of from 60 to 3,000 μm.

In one embodiment of the present invention, granules made according to the present invention have a broad particle diameter distribution. In another embodiment of the present invention, granules made according to the present invention have a narrow particle diameter distribution. The particle diameter distribution can be adjusted, if desired, by multiple sieving steps.

Granules made by the inventive process may contain residual moisture, moisture referring to water including water of crystallization and adsorbed water. The amount of water may be in the range of from 0.1 to 20% by weight, preferably 1 to 15% by weight, referring to the total solids content of the respective granule, and may be determined by Karl-Fischer-titration or by drying at 160 to 200° C. to constant weight with infrared light.

Particles of granules made by the inventive process have a regular shape: they are spheroidal.

Particles of granules made by the inventive process contain at least one chelating agent, hereinafter also referred to as chelating agent (A). Chelating agent (A) is selected from alkali metal salts of methyl glycine diacetic acid (MGDA) and of iminodisuccinic acid (IDS).

Alkali metal salts of MGDA are selected from compounds according to general formula (I a)

$$[CH_3—CH(COO)—N(CH_2—COO)_2]M_{3-x}H_x \qquad (I\ a)$$

wherein

M is selected from alkali metal cations, same or different, for example cations of lithium, sodium, potassium, rubidium, cesium, and combinations of at least two of the foregoing. Preferred examples of alkali metal cations are sodium and potassium and combinations of sodium and potassium.

x in formula (I a) is in the range of from zero to 1.0, preferred are zero to 0.5. In a particularly preferred embodiment, x is zero.

Alkali metals salts IDS are selected from compounds according to general formula (I b)

$$[H—N—(CH(COO)—CH_2COO)_2]M_{4-x}H_x \qquad (I\ c)$$

wherein

M is selected from alkali metal cations, same or different, as defined above, x in formula (I b) is in the range of from zero to 2.0, preferred are zero to 0.5. In a particularly preferred embodiment, x is zero.

In one embodiment of the present invention, alkali metal salts of MGDA are selected from lithium salts, potassium salts and preferably sodium salts of MGDA. MGDA can be partially or preferably fully neutralized with the respective alkali. In a preferred embodiment, an average of from 2.7 to three COOH groups of MGDA is neutralized with alkali metal, preferably with sodium. In a particularly preferred embodiment, chelating agent (A) is the trisodium salt of MGDA.

MGDA and its respective alkali metal salts are selected from the racemic mixtures, the D-isomers and the L-isomers, and from mixtures of the D- and L-isomers other than the racemic mixtures. Preferably, MGDA and its respective alkali metal salts are selected from the racemic mixture and from mixtures containing in the range of from 55 to 85 mole-% of the L-isomer, the balance being D-isomer. Particularly preferred are mixtures containing in the range of from 60 to 80 mole-% of the L-isomer, the balance being D-isomer. Other particularly preferred embodiments are racemic mixtures.

IDS and its respective alkali metal salts are selected from various mixtures of stereoisomers, for example D,D-IDS, L,L-IDS and D,L-IDS and combinations therefrom. Preferred are optically inactive mixtures since they are cheaper to be manufactured.

In any way, minor amounts of chelating agent (A) may bear a cation other than alkali metal. It is thus possible that minor amounts, such as 0.01 to 5 mol-% of total MGDA or IDS, respectively, bear alkali earth metal cations such as $Mg^{2+}$ or $Ca^{2+}$, or an $Fe^{2+}$ or $Fe^{3+}$ cation.

In one embodiment of the present invention, alkali metal salt of chelating agent (A) may contain one or more impurities that may result from the synthesis of the respective chelating agent (A). In the case of MGDA and its alkali metal salts, such impurities may be selected from propionic acid, lactic acid, alanine, nitrilotriacetic acid (NTA) or the like and their respective alkali metal salts. In the case of IDS, such impurities may be selected from maleic acid, monoamides of maleic/fumaric acid, and racemic asparagine. Such impurities are usually present in minor amounts. "Minor amounts" in this context refer to a total of 0.1 to 5% by weight, referring to alkali metal salt of chelating agent (A), preferably up to 2.5% by weight. In the context of the present invention, such minor amounts are neglected when determining the composition of granule made according to the inventive process.

In a special embodiment of the present invention, a combination alkali metal salts of at least two different chelating agents is used, for example sodium salts of MGDA and ISD in a weight ratio of from 1:1 to 5:1. In other embodiments, alkali metal salts of only one chelating agent is used, in particular sodium metal salts of MGDA.

Particles of granules made by the inventive process may further contain (B) at least one homo- or copolymer of (meth)acrylic acid, partially or fully neutralized with alkali, hereinafter also referred to as "polymer (B)". Polymers (B) that are homopolymers are also being referred to as "homopolymers (B)", and polymers (B) that are copolymers are also being referred to as "copolymers (B)".

Polymer (B) is selected from homopolymers (B) of (meth) acrylic acid and of copolymers (B) of (meth)acrylic acid, preferably of acrylic acid, partially or fully neutralized with alkali. In the context of the present invention, copolymers (B) are those in which at least 50 mol-% of the comonomers are (meth)acrylic acid, preferably at least 75 mol-%, even more preferably 80 to 99 mol-%.

Suitable comonomers for copolymers (B) are ethylenically unsaturated compounds, such as styrene, isobutene, ethylene, α-olefins such as propylene, 1-butylene, 1-hexene, and ethylenically unsaturated dicarboxylic acids and their alkali metal salty and anhydrides such as but not limited to maleic acid, fumaric acid, itaconic acid disodium maleate, disodium fumarate, itaconic anhydride, and especially maleic anhydride. Further examples of suitable comonomers are $C_1$-$C_4$-alkyl esters of (meth)acrylic acid, for example methyl acrylate, methyl methacrylate, ethyl acrylate, ethyl methacrylate, n-butyl acrylate.

In one embodiment of the present invention, (co)polymer (B) is selected from copolymers of (meth)acrylic acid and a comonomer bearing at least one sulfonic acid group per molecule. Comonomers bearing at least one sulfonic acid group per molecule may be incorporated into (co)polymer (B) as free acid or least partially neutralized with alkali. Particularly preferred sulfonic-acid-group-containing comonomers are 1-acrylamido-1-propanesulfonic acid, 2-acrylamido-2-propanesulfonic acid, 2-acrylamido-2-methylpropanesulfonic acid (AMPS), 2-methacrylamido-2-methylpropanesulfonic acid, 3-methacrylamido-2-hydroxy-propanesulfonic acid, allylsulfonic acid, methallylsulfonic acid, allyloxybenzenesulfonic acid, methallyloxybenzene-sulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as the sodium salts, potassium salts or ammonium salts thereof.

Copolymers (B) may be selected from random copolymers, alternating copolymers, block copolymers and graft copolymers, alternating copolymers and especially random copolymers being preferred.

Useful copolymers (B) are, for example, random copolymers of acrylic acid and methacrylic acid, random copolymers of acrylic acid and maleic anhydride, ternary random copolymers of acrylic acid, methacrylic acid and maleic anhydride, random or block copolymers of acrylic acid and styrene, random copolymers of acrylic acid and methyl acrylate. More preferred are homopolymers of methacrylic acid. Even more preferred are homopolymers of acrylic acid.

(Co)polymer (B) may constitute straight-chain or branched molecules. Branching in this context will be when at least one repeating unit of such (co)polymer (B) is not part of the main chain but forms a branch or part of a branch. Preferably, (co)polymer (B) is not cross-linked.

In one embodiment of the present invention, (co)polymer (B) has an average molecular weight $M_w$ in the range of from 1,200 to 30,000 g/mol, preferably from 2,500 to 20,000 g/mol and even more preferably from 5,000 to 18,500 g/mol, determined by gel permeation chromatography (GPC) and referring to the respective free acid.

In one embodiment of the present invention, (co)polymer (B) is at least partially neutralized with alkali, for example with lithium or potassium or sodium or combinations of at least two of the forgoing, especially with sodium. For example, in the range of from 10 to 100 mol-% of the carboxyl groups of (co)polymer (B) may be neutralized with alkali, especially with sodium.

In one embodiment of the present invention, (co)polymer (B) is selected from per-sodium salts of polyacrylic acid, thus, polyacrylic acid, fully neutralized with sodium.

In one embodiment of the present invention, (co)polymer (B) is selected from a combination of at least one polyacrylic acid and at least one copolymer of (meth)acrylic acid and a comonomer bearing at least one sulfonic acid group per molecule, both polymers being fully neutralized with alkali.

In one embodiment of the present invention, (co)polymer (B) is selected from per-sodium salts of polyacrylic acid with an average molecular weight $M_w$ in the range of from 1,200 to 30,000 g/mol, preferably from 2,500 to 20,000 g/mol and even more preferably from 5,000 to 18,500 g/mol, determined by gel permeation chromatography (GPC) and referring to the respective free acid.

In embodiments wherein a (co)polymer (B) is present, the weight ratio of (A):(B) is in the range of from 2:1 up to 1,000 to 1, preferably 7.5:1 up to 1,000:1, and more preferably 40:1 to 100:1. In this weight ratio, impurities of chelating agent (A) that stem from the synthesis, see above, are neglected.

Particles of granules made by the inventive process may contain at least 75% by weight of chelating agent (A). The contents of chelating agent (A) may be determined, e.g., by potentiometric titration with $FeCl_3$. The percentage refers to the solids content of said granule and may be determined by Karl-Fischer titration or by drying at 160 to 200° C. to constant weight with infrared light. It excludes crystal water.

Granules made by the inventive process may contain residual moisture, moisture referring to water including water of crystallization and adsorbed water. The amount of water may be in the range of from 0.1 to 20% by weight, preferably 1 to 15% by weight, referring to the total solids content of the respective granule, and may be determined by Karl-Fischer-titration or by drying at 160 to 200° C. to constant weight with infrared light.

In one embodiment of the present invention, in (co) polymer (B) containing granules made by the inventive process, chelating agent (A) and (co)polymer (B) are dispersed homogeneously. That means that essentially all particles of said granule contain chelating agent (A) and (co) polymer (B), and it means that they are not core-shell particles but chelating agent (A) and (co)polymer (B) are distributed over such particles. Such homogeneous dispersion is best accomplished when step (a) of the inventive process starts off from a solution of chelating agent (A) and (co)polymer (B).

In another embodiment of the present invention, in (co) polymer (B) containing granules made by the inventive process, chelating agent (A) and (co)polymer (B) are non-homogeneously dispersed. Such non-homogeneous dispersion is best accomplished when step (a) of the inventive process starts off from a slurry of chelating agent (A) and (co)polymer (B).

The inventive process is now described in more detail.

In step (a), an aqueous solution or aqueous slurry of chelating agent (A) and, if applicable, (co)polymer (B), is provided. Such aqueous solution or slurry can be manufactured be processes known per se. For example, an aqueous solution of alkali metal salts of chelating agent (A) may be obtained from their synthesis. Such solution may be further concentrated by addition of solid chelating agent (A) or by evaporation of water. (Co)polymer (B) may be added, if desired, as solid or as aqueous solution.

Step (a) can be performed at ambient temperature. In other embodiments, step (a) is being performed at 20° C. or at elevated temperature, for example at a temperature in the range of from 25 to 90° C., preferably 60 to 75° C.

The water used in step (a) may be present in an amount that both chelating agent (A) and (co)polymer (B) are dissolved. However, it is also possible to use less amounts of water and mix chelating agent (A) and (co)polymer (B) in a way that a slurry is being formed. Solutions are preferred.

In one embodiment of the present invention, the total solids content of such solution or slurry formed as result of step (a) is in the range of from 20 to 75%, preferably 35 to 50%.

In step (b), most of the water is removed from the aqueous solution or slurry provided in step (a) by spray granulation in a fluidized bed.

The aqueous slurry or aqueous solution according to step (a) may have a temperature in the range of from 15 to 95° C., preferably 20 to 90° C. and even more preferably 50 to 90° C.

In step (b), said aqueous slurry or aqueous solution is introduced into a spray granulator. In the context of the present invention, a spray granulator usually contains a fluidized bed, in the context of the present invention it is a fluidized bed of chelating agent (A), or of granule made according to the present invention. Such fluidized bed of chelating agent (A) is preferably in the form of chelating agent in crystalline form, for example at least 66% crystalline form, determined by X-Ray diffraction. In one embodiment of the present invention, the fluidized bed may have a temperature in the range of from 75 to 150° C., preferably 80 to 110° C.

Spraying is being performed through one or more nozzles per spray granulator. Suitable nozzles are, for example, high-pressure rotary drum atomizers, rotary atomizers, three-fluid nozzles, single-fluid nozzles, three-fluid nozzles and two-fluid nozzles, single-fluid nozzles and two-fluid nozzles and three-fluid nozzles being preferred. The first fluid is the aqueous slurry or aqueous solution or emulsion, respectively, the second fluid is compressed hot gas, also referred to as hot gas inlet stream, for example with a pressure of 1.1 to 7 bar. The hot gas inlet stream may have a temperature in the range of from at least 125° C. to 250° C., preferably 150 to 250° C., even more preferably 160 to 220° C.

In step (b), the aqueous slurry or aqueous solution of complexing agent (A) and, optionally, (co)polymer (B) is introduced in the form of droplets into said fluidized bed. In one embodiment of the present invention, the droplets formed during the spray-granulating have an average diameter in the range of from 10 to 500 μm, preferably from 20 to 180 μm, even more preferably from 30 to 100 μm.

In one embodiment of the present invention, the off-gas departing the spray granulator may have a temperature in the range of from 40 to 140° C., preferably 80 to 110° C. but in any way colder than the hot gas stream. Preferably, the temperature of the off-gas departing the drying vessel and the temperature of the solid product present in the drying vessel are identical.

In one embodiment of the present invention, the pressure in the spray tower or spray granulator in step (b) is normal pressure ±100 mbar, preferably normal pressure ±20 mbar, for example one mbar less than normal pressure.

In one embodiment of the present invention, especially in a process for making an inventive granule, the average residence time of chelating agent (A) in step (b) is in the range of from 2 minutes to 4 hours, preferably from 30 minutes to 2 hours.

In embodiments wherein an aged slurry is used, such aging may take in the range of from 2 hours to 24 hours at the temperature preferably higher than ambient temperature.

In the course of step (b), most of the water is removed in a fluidized bed. Most of the water shall mean that a residual moisture content of 0.1 to 20% by weight may remain, referring to the granule. In embodiments that start off from a solution, about 51 to 75% by weight of the water present in the aqueous solution is removed in step (b).

A granule is obtained, hereinafter also referred to as “resultant particulate residue” or “granule from step (b)”. Said granule from step (b) has the appearance of a granule that may have a bulk density in the range of from 700 to 950 g/I. Particles of granule from step (b) may show some degree of irregularity in shape.

At the end of step (b), the granule from step (b) is removed from the spray granulator. Said granule has been at least partially formed in the course of step (b) of the inventive process. Said removal may be performed through one or more openings in the spray tower or spray granulator. Preferably, such one or more openings are at the bottom of the respective spray tower or spray granulator. Granules are removed including fines and lumps.

In step (c), the granule from step (b) is treated with air or an inert gas or a combination of the foregoing in a vessel of which at least one part rotates around a horizontal axis. Examples of inert gasses are nitrogen and rare gasses such as, but not limited to argon. Mixtures of air and inert gasses are feasible as well. Preferably, such air or inert gas is “dry”. In this context, dry is meant to understand less than 5 g $H_2O$ per kg of gas.

As mentioned before, step (c) is carried out in a vessel of which at least one part rotates around a horizontal axis, for example a mixing element or a mixer. Preferably, the mixing element rotates around a horizontal axis while the rest of the reactor does not.

Various embodiments of reactor design are possible to perform step (c) of the inventive process. Step (c) of the inventive process is carried out in a compulsory mixer. Examples of compulsory mixers are paddle mixers and ploughshare mixers.

Even more preferred, step (c) is performed in a so-called free-fall mixer.

While free fall mixers utilize the gravitational forces for moving the particles compulsory mixers work with moving mixing elements and, in particular, with rotating mixing elements that are installed in the mixing room. In the context of the present invention, the mixing room is the reactor interior. Examples of compulsory mixers are ploughshare mixers, paddle mixers and shovel mixers. Preferred are ploughshare mixers. Preferred ploughshare mixers are installed horizontally, the term horizontal referring to the axis around which the mixing element rotates. Preferably, the inventive process is carried out in a shovel mixing tool, in a paddle mixing tool, in a blade mixing tool and, more preferably, in a ploughshare mixer, for example in accordance with the hurling and whirling principle.

In a preferred embodiment of the present invention, the inventive process is carried out in a free fall mixer. Free fall mixers are using the gravitational force to achieve mixing. In a preferred embodiment, step (c) of the inventive process is carried out in a drum or pipe-shaped vessel that rotates around its horizontal axis. In a more preferred embodiment, step (c) of the inventive process is carried out in a rotating vessel that has baffles.

In one embodiment of the present invention the vessel or at least parts of it rotates with a speed in the range of from 5 to 200 rounds per minute, preferred are 5 to 60 rounds per minute.

In one embodiment of the present invention, step (c) of the inventive process is performed with compulsory mixer operating with a Froude Number (“Fr”) in the range of from 1 to 10. In another embodiment, step (c) of the inventive process is performed with a free-fall mixer operated at a Froude Number below 1. In the context of the present invention, the Froude Number is defined as $Fr=v^2/g\cdot l$, with the variable v as circumferential speed, the variable l being the diameter of, e.g., of the respective compulsory mixer or free-fall mixer, and the variable g being the gravitational acceleration.

In a preferred version of the present invention, which allows for the pneumatic conveying of said particulate material, a pressure difference in the range of from up to 400 mbar is applied. Granule may be blown out of the mixer or removed by suction.

In one embodiment of the present invention, the inlet pressure is higher but close to the desired reactor pressure. Pressure drops of gas inlet have to be compensated.

In the course of the inventive process strong shear forces are introduced due to the shape of the reactor, the particles in the agglomerates are exchanged frequently, which allows for the accessibility of the full particle surface. By the inventive process, particulate materials may be coated in short time, and in particular cohesive particles may be coated very evenly.

In a preferred embodiment of the present invention the inventive process comprises the step of removing the coated material from the vessel or vessels, respectively, by pneumatic conveying, e.g. 20 to 100 m/s.

In one embodiment of the present invention, step (c) is carried out at a temperature in the range of from ambient temperature to 115° C., preferably 30 to 80° C. Preferably, the material obtained from step (b) is introduced directly into step (c) and cools down during step (c).

In one embodiment of the present invention, step (c) has a duration in the range of from 1 minute to 5 hours, preferably 5 to 30 minutes.

During step (c), the gas atmosphere may be renewed, for example once up to 5 times per hour.

After step (c), a granule with excellent spherical shape of the particles is obtained. It shows reduced hygroscopicity and can be used directly for manufacture of, e.g., automatic dishwashing formulations.

In a preferred embodiment of the present invention, step (c) is followed by a step (d) including the removal of fines. Such step (d) may include a sieving step or winnowing, or by air classification. Fines formed during step (c) may be removed easily, and, e.g., recycled in step (b). In the context of step (d), fines are meant to have a diameter in the range of from almost zero to less than 100 μm.

The share of fines withdrawn in step (d) may be in the range of from 0.5 to 20% by weight of the total chelating agent (A) removed after step (c), preferably 4 to 8% by weight.

Further steps are possible, for example the removal of lumps after step (b) or (d), preferably after step (b). In this context, said lumps to be separated off may also be referred to as overs, and lumps are particles that have a minimum particle diameter of 2 mm or even more or that exceed the specified maximum diameter by at least 15%. Lumps may be removed, e.g., with the help of a discharge screw or a rotary valve, usually together with desired product, and then classified.

A further aspect of the present invention is related to granules, hereinafter also referred to as inventive granules. Inventive granules contain (A) at least one chelating agent selected from alkali metal salts of methyl glycine diacetic acid (MGDA) and iminodisuccinic acid (IDS), (B) at least one copolymer of (meth)acrylic acid with a comonomer bearing at least one sulfonic acid group per molecule, partially or fully neutralized with alkali, hereinafter also referred to as copolymer (B*) or simply (B*), in a weight ratio of (A):(B*) of from 2:1 up to 1,000:1, preferably from 7.5:1 up to 1,000:1, wherein said granule contains at least 75% by weight of chelating agent (A), and wherein said granule has an average broadness to length ratio in the range of from 1:1 to 1:0.75.

The average broadness to length ratio is determined as WI ratio, for example, determined by dynamic picture analysis, for example with a Camsizer.

Inventive granules may contain (A) and (B*) in molecularly disperse form or as core-shell arrangement, molecularly disperse form being preferred.

In the context of the present invention, the term “in molecularly disperse form” implies that all or a vast majority, for example at least 80% of the particles of inventive granules contain chelating agent (A) and copolymer (B*). The term “in molecularly disperse form” implies as well that chelating agent (A) and copolymer (B*) are distributed over the diameter of the particle in an almost homogeneous way.

In one embodiment of the present invention, inventive granules are selected from granules with an average particle diameter in the range of from 0.1 mm to 2 mm, preferably 0.75 mm to 1.25 mm.

In one embodiment of the present invention, inventive granule contains in the range of from 85 to 99.9% by weight chelating agent (A) and 0.1 to 15% by weight copolymer (B*), percentages referring to the solids content of said granule. In this weight ratio, impurities of chelating agent (A) that stem from the synthesis, see above, are neglected.

Chelating agent (A) has been described in detail above.

Copolymer (B*) is a copolymer of copolymer of (meth) acrylic acid with a comonomer bearing at least one sulfonic acid group per molecule, partially or fully neutralized with alkali, preferably a copolymer of acrylic acid with a comonomer bearing at least one sulfonic acid group per molecule.

In a preferred embodiment, said comonomer bearing at least one sulfonic acid group per molecule is 2-acrylamido-2-methylpropanesulfonic acid.

In one embodiment of the present invention, copolymer (B*) has an average molecular weight $M_w$ in the range of from 1,200 to 30,000 g/mol, preferably from 2,500 to 20,000 g/mol and even more preferably from 5,000 to 19,000 determined by gel permeation chromatography (GPC) and referring to the respective free acid.

Copolymers (B*) may be selected from block copolymers, graft copolymers and random copolymers, random copolymers being preferred. Copolymers (B*) may be straight chain or branched, straight chain being preferred.

Inventive granules exhibit overall advantageous properties including but not limited to an excellent hygroscopicity and bulk density. Furthermore, the tendency to yellowing, especially in the presence of bleaching agents, is low. They are therefore excellently suitable for the manufacture of cleaning agents that contain at least one bleaching agent, such cleaning agent hereinafter also being referred to as bleach. In particular, and inventive granules are suitable for the manufacture cleaning agent for fibers or hard surfaces wherein said cleaning agent contains at least one peroxy compound.

Another aspect of the present invention is therefore the use of an inventive granule for the manufacture of a cleaning agent that may contain at least one bleaching agent, and in particular for the manufacture of cleaning agent for fibers or hard surfaces, wherein said cleaning agent contains at least one peroxy compound. Another aspect of the present invention is a process for making at a cleaning agent by combining at least one inventive granule with at least one bleaching agent, preferably at least one peroxy compound. Another aspect of the present invention is a cleaning agent, hereinafter also being referred to as inventive cleaning agent.

Inventive cleaning agents may contain at least one bleaching agent and at least one inventive granule. Inventive cleaning agents show a reduced tendency for yellowing and therefore have an extended shelve-life.

Examples of suitable peroxy compounds are sodium perborate, anhydrous or for example as monohydrate or as tetrahydrate or so-called dihydrate, sodium percarbonate, anhydrous or, for example, as monohydrate, hydrogen peroxide, persulfates, organic peracids such as peroxylauric acid, peroxystearic acid, peroxy-α-naphthoic acid, 1,12-diperoxydodecanedioic acid, perbenzoic acid, peroxylauric acid, 1,9-diperoxyazelaic acid, diperoxyisophthalic acid, in each case as free acid or as alkali metal salt, in particular as sodium salt, also sulfonylperoxy acids and cationic peroxy acids.

In a preferred embodiment, peroxy compound is selected from inorganic percarbonates, persulfates and perborates. Examples of sodium percarbonates are 2 $Na_2CO_3.3H_2O_2$. Examples of sodium perborate are $(Na_2[B(OH)_2(O_2)]_2)$, sometimes written as $NaBO_2.O_2.3H_2O$ instead. Most preferred peroxy compound is sodium percarbonate.

The term “cleaning agents” includes compositions for dishwashing, especially hand dishwash and automatic dishwashing and ware-washing, and compositions for hard surface cleaning such as, but not limited to compositions for bathroom cleaning, kitchen cleaning, floor cleaning, descaling of pipes, window cleaning, car cleaning including truck cleaning, furthermore, open plant cleaning, cleaning-in-place, metal cleaning, disinfectant cleaning, farm cleaning, high pressure cleaning, and in addition, laundry detergent compositions.

Such cleaning agents may be liquids, gels or preferably solids at ambient temperature, solids cleaning agents being preferred. They may be in the form of a powder or granule or in the form of a unit dose, for example as a tablet.

In one embodiment of the present invention, inventive cleaning agents may contain in the range of from 2 to 50% by weight of inventive granule, in the range of from 0.5 to 15% by weight of bleach.

Percentages are based on the solids content of the respective inventive cleaning agent.

Inventive cleaning agents may contain further ingredients such as one or more surfactants that may be selected from non-ionic, zwitterionic, cationic, and anionic surfactants. Other ingredients that may be contained in inventive cleaning agents may be selected from bleach activators, bleach catalysts, corrosion inhibitors, sequestering agents other than chelating agent (A), enzymes, fragrances, dyestuffs, antifoams, and builders.

Particularly advantageous inventive cleaning agents may contain one or more complexing agents other than MGDA or GLDA. Advantageous detergent compositions for cleaners and advantageous laundry detergent compositions may contain one or more sequestrant (chelating agent) other than a mixture according to the present invention. Examples for sequestrants other than a mixture according to the present invention are citrate, phosphonic acid derivatives, for example the disodium salt of hydroxyethane-1,1-diphosphonic acid ("HEDP"), and polymers with complexing groups like, for example, polyethylenimine in which 20 to 90 mole-% of the N-atoms bear at least one $CH_2COO^-$ group, and their respective alkali metal salts, especially their sodium salts, for example IDS-$Na_4$, and trisodium citrate, and phosphates such as STPP (sodium tripolyphosphate). Due to the fact that phosphates raise environmental concerns, it is preferred that advantageous inventive cleaning agents are free from phosphate. "Free from phosphate" should be understood in the context of the present invention, as meaning that the content of phosphate and polyphosphate is in sum in the range from 10 ppm to 0.2% by weight, determined by gravimetric methods and referring to the respective inventive cleaning agent.

Inventive cleaning agents may contain one or more surfactant, preferably one or more non-ionic surfactant.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (I)

(I)

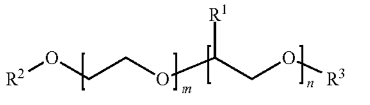

in which the variables are defined as follows:

$R^1$ is identical or different and selected from hydrogen and linear $C_1$-$C_{10}$-alkyl, preferably in each case identical and ethyl and particularly preferably hydrogen or methyl, $R^2$ is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$, $R^3$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, m and n are in the range from zero to 300, where the sum of n and m is at least one, preferably in the range of from 3 to 50. Preferably, m is in the range from 1 to 100 and n is in the range from 0 to 30.

In one embodiment, compounds of the general formula (I) may be block copolymers or random copolymers, preference being given to block copolymers.

Other preferred examples of alkoxylated alcohols are, for example, compounds of the general formula (II)

(II)

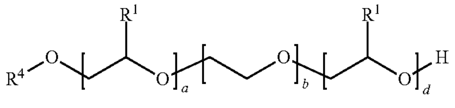

in which the variables are defined as follows:

$R^1$ is identical or different and selected from hydrogen and linear $C_1$-$C_0$-alkyl, preferably identical in each case and ethyl and particularly preferably hydrogen or methyl, $R^4$ is selected from $C_6$-$C_{20}$-alkyl, branched or linear, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$, a is a number in the range from zero to 10, preferably from 1 to 6, b is a number in the range from 1 to 80, preferably from 4 to 20, d is a number in the range from zero to 50, preferably 4 to 25.

The sum a+b+d is preferably in the range of from 5 to 100, even more preferably in the range of from 9 to 50.

Preferred examples for hydroxyalkyl mixed ethers are compounds of the general formula (III)

(III)

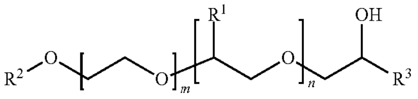

in which the variables are defined as follows:

$R^1$ is identical or different and selected from hydrogen and linear $C_1$-$C_{10}$-alkyl, preferably in each case identical and ethyl and particularly preferably hydrogen or methyl, $R^2$ is selected from $C_8$-$C_{22}$-alkyl, branched or linear, for example iso-$C_{11}H_{23}$, iso-$C_{13}H_{27}$, n-$C_8H_{17}$, n-$C_{10}H_{21}$, n-$C_{12}H_{25}$, n-$C_{14}H_{29}$, n-$C_{18}H_{33}$ or n-$C_{18}H_{37}$, $R^3$ is selected from $C_1$-$C_{18}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, isodecyl, n-dodecyl, n-tetradecyl, n-hexadecyl, and n-octadecyl.

The variables m and n are in the range from zero to 300, where the sum of n and m is at least one, preferably in the range of from 5 to 50. Preferably, m is in the range from 1 to 100 and n is in the range from 0 to 30.

Compounds of the general formula (II) and (III) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglucosides and branched $C_8$-$C_{14}$-alkyl polyglycosides such as compounds of general average formula (IV) are likewise suitable.

(IV)

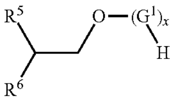

wherein the variables are defined as follows:

$R^5$ is $C_1$-$C_4$-alkyl, in particular ethyl, n-propyl or isopropyl, $R^6$ is —$(CH_2)_2$—$R^5$, $G^1$ is selected from monosaccharides with 4 to 6 carbon atoms, especially from glucose and xylose, x in the range of from 1.1 to 4, x being an average number.

An overview of suitable further nonionic surfactants can be found in EP-A 0 851 023 and in DE-A 198 19 187.

Mixtures of two or more different nonionic surfactants may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (V)

$$R^7R^8R^9N \rightarrow O \quad (V)$$

wherein $R^7$, $R^8$ and $R^9$ are selected independently from each other from aliphatic, cycloaliphatic or $C_2$-$C_4$-alkylene $C_{10}$-$C_{20}$-alkylamido moieties. Preferably, $R^7$ is selected from $C_8$-$C_{20}$-alkyl or $C_2$-$C_4$-alkylene $C_{10}$-$C_{20}$-alkylamido and $R^8$ and $R^9$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

Examples of suitable anionic surfactants are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples for suitable anionic surfactants are soaps, for example the sodium or potassium salts of stearoic acid, oleic acid, palmitic acid, ether carboxylates, and alkylether phosphates.

Preferably, laundry detergent compositions contain at least one anionic surfactant.

In one embodiment of the present invention, inventive cleaning agents that are determined to be used as laundry detergent compositions may contain 0.1 to 60% by weight of at least one surfactant, selected from anionic surfactants, amphoteric surfactants and amine oxide surfactants.

In one embodiment of the present invention, inventive cleaning agents that are determined to be used for hard surface cleaning may contain 0.1 to 60% by weight of at least one surfactant, selected from anionic surfactants, amphoteric surfactants and amine oxide surfactants.

In a preferred embodiment, inventive cleaning agents do not contain any anionic detergent.

Inventive cleaning agents may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Inventive cleaning agents may comprise one or more bleach activators, for example N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Inventive cleaning agents may comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol. In one embodiment of the present invention, inventive cleaning agents comprise in total in the range from 0.1 to 1.5% by weight of corrosion inhibitor.

Inventive cleaning agents may comprise one or more builders, selected from organic and inorganic builders. Examples of suitable inorganic builders are sodium sulfate or sodium carbonate or silicates, in particular sodium disilicate and sodium metasilicate, zeolites, sheet silicates, in particular those of the formula $\alpha$-$Na_2Si_2O_5$, $\beta$-$Na_2Si_2O_5$, and $\delta$-$Na_2Si_2O_5$, also fatty acid sulfonates, $\alpha$-hydroxypropionic acid, alkali metal malonates, fatty acid sulfonates, alkyl and alkenyl disuccinates, tartaric acid diacetate, tartaric acid monoacetate, oxidized starch, and polymeric builders, for example polycarboxylates and polyaspartic acid.

Examples of organic builders are especially polymers and copolymers. In one embodiment of the present invention, organic builders are selected from polycarboxylates, for example alkali metal salts of (meth)acrylic acid homopolymers or (meth)acrylic acid copolymers, partially or completely neutralized with alkali.

Suitable comonomers for (meth) are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 3,000 to 10,000 g/mol.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilic or hydrophobic monomer as listed below.

Suitable hydrophobic monomers are, for example, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. Polyalkylene glycols here may comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, amphoteric polymers can also be used as builders.

Inventive cleaning agents may comprise, for example, in the range from in total 10 to 50% by weight, preferably up to 20% by weight, of builder.

In one embodiment of the present invention, inventive cleaning agents according to the invention may comprise one or more cobuilders.

Inventive cleaning agents may comprise one or more antifoams, selected for example from silicone oils and paraffin oils.

In one embodiment of the present invention, inventive cleaning agents comprise in total in the range from 0.05 to 0.5% by weight of antifoam.

Inventive cleaning agents may comprise one or more enzymes. Examples of enzymes are lipases, hydrolases, amylases, proteases, cellulases, esterases, pectinases, lactases and peroxidases.

In one embodiment of the present invention, inventive cleaning agents may comprise, for example, up to 5% by weight of enzyme, preference being given to 0.1 to 3% by weight. Said enzyme may be stabilized, for example with the sodium salt of at least one $C_1$-$C_3$-carboxylic acid or $C_4$-$C_{10}$-dicarboxylic acid. Preferred are formates, acetates, adipates, and succinates.

In one embodiment of the present invention, inventive cleaning agents may comprise at least one zinc salt. Zinc salts can be selected from water-soluble and water-insoluble zinc salts. In this connection, within the context of the present invention, water-insoluble is used to refer to those zinc salts which, in distilled water at 25° C., have a solubility of 0.1 g/l or less. Zinc salts which have a higher solubility in water are accordingly referred to within the context of the present invention as water-soluble zinc salts.

In one embodiment of the present invention, zinc salt is selected from zinc benzoate, zinc gluconate, zinc lactate, zinc formate, $ZnCl_2$, $ZnSO_4$, zinc acetate, zinc citrate, $Zn(NO_3)_2$, $Zn(CH_3SO_3)_2$ and zinc gallate, preferably $ZnCl_2$, $ZnSO_4$, zinc acetate, zinc citrate, $Zn(NO_3)_2$, $Zn(CH_3SO_3)_2$ and zinc gallate.

In another embodiment of the present invention, zinc salt is selected from ZnO, ZnO.aq, $Zn(OH)_2$ and $ZnCO_3$. Preference is given to ZnO.aq.

In one embodiment of the present invention, zinc salt is selected from zinc oxides with an average particle diameter (weight-average) in the range from 10 nm to 100 μm.

The cation in zinc salt can be present in complexed form, for example complexed with ammonia ligands or water ligands, and in particular be present in hydrated form. To simplify the notation, within the context of the present invention, ligands are generally omitted if they are water ligands.

Depending on how the pH of mixture according to the invention is adjusted, zinc salt can change. Thus, it is for example possible to use zinc acetate or $ZnCl_2$ for preparing formulation according to the invention, but this converts at a pH of 8 or 9 in an aqueous environment to ZnO, $Zn(OH)_2$ or ZnO.aq, which can be present in non-complexed or in complexed form.

Zinc salt may be present in those inventive cleaning agents that are solid at room temperature. In such inventive cleaning agents zinc salts are preferably present in the form of particles which have for example an average diameter (number-average) in the range from 10 nm to 100 μm, preferably 100 nm to 5 μm, determined for example by X-ray scattering.

Zinc salt may be present in those inventive cleaning agents that are liquid at room temperature. In such inventive cleaning agents zinc salts are preferably present in dissolved or in solid or in colloidal form.

In one embodiment of the present invention, inventive cleaning agents comprise in total in the range from 0.05 to 0.4% by weight of zinc salt, based in each case on the solids content of the cleaning agent in question.

Here, the fraction of zinc salt is given as zinc or zinc ions. From this, it is possible to calculate the counterion fraction.

In one embodiment of the present invention, inventive cleaning agents are free from heavy metals apart from zinc compounds. Within the context of the present, this may be understood as meaning that inventive cleaning agents are free from those heavy metal compounds which do not act as bleach catalysts, in particular of compounds of iron and of bismuth. Within the context of the present invention, “free from” in connection with heavy metal compounds is to be understood as meaning that the content of heavy metal compounds which do not act as bleach catalysts is in sum in the range from 0 to 100 ppm, determined by the leach method and based on the solids content. Preferably, inventive cleaning agents has, apart from zinc, a heavy metal content below 0.05 ppm, based on the solids content of the formulation in question. The fraction of zinc is thus not included.

Within the context of the present invention, “heavy metals” are deemed to be all metals with a specific density of at least 6 $g/cm^3$ with the exception of zinc. In particular, the heavy metals are metals such as bismuth, iron, copper, lead, tin, nickel, cadmium and chromium.

Preferably, inventive cleaning agents comprise no measurable fractions of bismuth compounds, i.e. for example less than 1 ppm.

Inventive cleaning agents are excellent for cleaning hard surfaces and fibres.

The invention is illustrated by the following working examples.

General remarks: The bulk density was determined in accordance with ISO 697 ($2^{nd}$ edition 1981-03-01).

The average broadness to length ratio was determined with a Retsch CAMSIZER XT.

The hygroscopicity was determined as follows:

About 5 g of the respective sample were placed on a Petri dish, and he weight was determined. The Petri dish with the sample were put in a conditioning cabinet with 38° C. and 78% relative humidity. The weight was determined again after 1 hour, 3 hours, 6 hours, 24 hours, 48 hours, etc. Each determination was carried out in duplicate.

Starting Materials:

(A.1): trisodium salt of methylglycine diacetic acid ($MGDA-Na_3$), provided as 40% by weight aqueous solution (B.1): polyacrylic acid, 25 mol-% neutralized with sodium hydroxide, $M_w$: 4,000 g/mol, determined by GPC and referring to the free acid (B.2) random copolymer of acrylic acid and 2-acrylamido-2-methylpropanesulfonic acid (AMPS), partially neutralized with sodium, pH value 5, $M_w$: 18,500 g/mol.

I. Manufacture of spray liquors, step (a)

I.1 Manufacture of spray liquor SL.1, step (a.1)

A vessel was charged with 15.28 kg of an aqueous solution of (A.1) (40% by weight) and 720 g of a (aqueous solution of (B.1) (45% by weight). The spray liquor SL.1 so obtained was stirred vigorously and then heated to 70° C. and subjected to spray granulation.

I.2 Manufacture of spray liquor SL.2

A vessel was charged with 42.697 kg of an aqueous solution of (A.1) (40% by weight), 7.303 kg granules of $MGDA-Na_3$ (12% by weight moisture content), and 3,668 g of an aqueous solution of (B.2) (40% by weight). The spray liquor SL.2 so obtained was stirred and then heated to 70° C. and subjected to spray granulation.

II. Spray granulation, step (b)

II.1 Spray granulation of Spray Liquor SL.1, step (b.1)

A lab scale granulator, commercially available as Glatt Procell Lab System with Vario 3 Insert, was charged with 0.9 kg of solid $MGDA-Na_3$ spherical particles, diameter 350 to 1000 μm, and 600 g of milled $MGDA-Na_3$ particles. An amount of 200 $Nm^3/h$ of air with a temperature of 165 to 168° C. was blown from the bottom. A fluidized bed of $MGDA-Na_3$ particles was obtained. The above liquor SL.1 was introduced by spraying 7 kg of SL.1 (70° C.) per hour into the fluidized bed from the bottom through a two-fluid nozzle, absolute pressure in the nozzle: 4.3 bar. Granules were formed, and the bed temperature, which corresponds to the surface temperature of the solids in the fluidized bed, was 95 to 101° C.

Particles that were large (heavy) enough fall through the zigzag air classifier (operated at 1.8 to 2 bar relative pressure) were continuously transferred into a sample bottle. The smaller (lighter) granules were blown through the recycle back into the fluidized bed by the air classifier.

When about 1 L of granules were collected in the sample bottle, the bottle is replaced by a new sample bottle. The collected granules were subjected to a sieving step, mesh size 1 mm. Two fractions were obtained: coarse particles (diameter>1 mm) and value fraction (<1 mm). Coarse particles (diameter>1 mm), were milled down together with small amounts of value fraction using a hammer mill (Kinetatica Polymix PX-MFL 90D) at 4000 rounds per minute (rpm), 2 mm mesh. The powder so obtained was returned into the fluidized bed. The major part of the value fraction, which was not milled down, left the process and was collected.

After consumption of 10 kg of SL.1 a steady state was reached. Then, the fraction<1 mm was collected as inventive granules.

The residual moisture of C-Gr.1 was determined to be 12.0 referring to the total solids content of the granule and determined by Karl-Fischer titration.

In the above example, hot air of 170° C. can be replaced by hot $N_2$ having a temperature of 170° C.

II.2 Spray granulation of Spray Liquor SL.2, step (b.2)

A lab scale granulator, commercially available as Glatt Procell Lab System with Vario 3 Insert, was charged with 0.9 kg of solid $MGDA-Na_3$ spherical particles, diameter 350 to 1000 μm, and 600 g of milled $MGDA-Na_3$ particles. An amount of 200 $Nm^3/h$ of air with a temperature of 170-175° C. was blown from the bottom. A fluidized bed of $MGDA-Na_3$ particles was obtained. The above liquor SL.2 was introduced by spraying 8 kg of SL.2 (70° C.) per hour into the fluidized bed from the bottom through a two-fluid nozzle, absolute pressure in the nozzle: 4.35 bar. Granules were formed, and the bed temperature, which corresponds to the surface temperature of the solids in the fluidized bed, was 95 to 101° C.

Particles that were large (heavy) enough fall through the zigzag air classifier (operated at 1.8 to 2 bar relative pressure) were continuously transferred into a sample bottle. The smaller (lighter) granules were blown through the recycle back into the fluidized bed by the air classifier.

When about 1 L of granules were collected in the sample bottle it was replaced by a new sample bottle. The collected granules were subjected to a sieving step, mesh size 1 mm. Two fractions were obtained: coarse particles (diameter>1 mm) and value fraction (≤1 mm). Coarse particles (diameter>1 mm), were milled down together with small amounts of value fraction using a hammer mill (Kinetatica Polymix PX-MFL 90D) at 4000 rpm (rounds per minute), 2 mm mesh. The powder so obtained was returned into the fluidized bed. The major part of the value fraction, which was not milled down, left the process and was collected.

The middle fraction<1 mm was collected as comparative granule C-Gr.2. The residual moisture of C-Gr.2 was determined to be 12.0 referring to the total solids content of the granule.

In the above example, hot air of 170° C. can be replaced by hot $N_2$ having a temperature of 170° C.

III. Treatment in a Plough-Share Mixer, step (c), general protocol

III.1 Treatment of C-Gr.1

A Lödige mixer MK 5 (total volume: 5 ltr.) was charged with 1885 g of granule C-Gr.1. Then, at ambient temperature, the Lödige mixer was operated at Fr in the range of from 2 to 3 over a period of 16 minutes. Fines were removed by sieving, mesh 100 μm. Inventive granule Gr.1 was obtained. The residual moisture content was 12.0% by weight and its average broadness to length ratio (b/I) was 0.793.

III.2 Treatment of C-Gr.2

A Lödige mixer MK 5 (total volume: 5 ltr.) was charged with 1885 g of granule C-Gr.2. Then, at ambient temperature, the Lödige was operated at Fr in the range of from 2 to 3 over a period of 16 minutes. Fines were removed by sieving, mesh 100 μm. Inventive granule Gr.2 was obtained. The residual moisture content was 12.0% by weight and its average broadness to length ratio was 0.795.

III.3 Physical characterization of the respective granules

Hygroscopicity: Capacity of granules to absorb moisture under specific conditions.

Samples of 5 g of granule were placed in a conditioning cabinet at 38° C. and 78% relative humidity. The hygroscopicity was measured after 24 hours.

$$\text{Hygroscopicity [\%]} = (M2 - M0) \times 100 / M1$$

M0=weight of empty petri dish (g)

M1=initial weight (g)

M2=final weight (g)

Bulk Density:

Mass in gram of a product that takes up the volume of one milliliter under specific conditions, measured following ISO 697.

Collecting container according to ISO 697 was placed under a funnel. By means of a cover flap the orifice of the funnel was closed. Then the funnel was then filled to the upper edge with sample, the cover flap was removed quickly, and the content of the funnel was poured into the collecting container. By pulling out the collecting container, the excess granulate is wiped off. Collecting container was cleaned outside and then its weight determined.

Bulk density [g/ml]=(M1−M0)/V

M1=mass of filled collecting container (g)
M0=mass of empty collecting container (g)

TABLE 1

Bulk density and hygroscopicity of inventive granules and of comparative granules

| | C-Gr.1 | Gr.1 | C-Gr.2 | Gr.2 |
|---|---|---|---|---|
| MGDA-$Na_3$ content [%] | 77 | 77 | 78 | 78 |
| Bulk density [g/l] | 774 | 817 | 756 | 802 |
| Hygroscopicity [%] | 19 | 18 | 16 | 15 |

The MGDA content refers to active matter and was determined by potentiometric $FeCl_3$ titration.

From inventive granules, example detergent compositions for automatic dishwashing detergents can be formulated by mixing the respective components according to Table 2. From comparative granules, comparative detergent compositions for automatic dishwashing detergents can be formulated by mixing the respective components according to Table 2.

TABLE 2

Example detergent compositions for automatic dishwashing

| All amounts in g/sample | ADW.1 | ADW.2 | ADW.3 |
|---|---|---|---|
| either of Gr.1, Gr.2, C-Gr.1 or C-Gr.2 | 30 | 22.5 | 15 |
| Protease | 2.5 | 2.5 | 2.5 |
| Amylase | 1 | 1 | 1 |
| n-$C_{18}H_{37}$-$O(CH_2CH_2O)_9H$ | 5 | 5 | 5 |
| Sodium percarbonate | 10.5 | 10.5 | 10.5 |
| TAED | 4 | 4 | 4 |
| $Na_2CO_3$ | 19.5 | 19.5 | 19.5 |
| Sodium citrate dihydrate | 15 | 22.5 | 30 |
| HEDP | 0.5 | 0.5 | 0.5 |

TABLE 2-continued

Example detergent compositions for automatic dishwashing

| All amounts in g/sample | ADW.1 | ADW.2 | ADW.3 |
|---|---|---|---|
| ethoxylated polyethylenimine, 20 EO/NH group, $M_n$: 30,000 g/mol | optionally: 0.1 | optionally: 0.1 | optionally: 0.1 |

The invention claimed is:

1. A process for making a granule comprising (A) at least one chelating agent comprising one or more alkali metal salts of methyl glycine diacetic acid (MGDA), and, optionally, (B) at least one homo-or copolymer of (meth) acrylic acid, partially or fully neutralized with alkali, said process comprising the steps of (a) providing an aqueous solution or slurry containing chelating agent (A) and, if applicable, (co) polymer (B), (b) removing most of said water by spray granulation in a fluidized bed, thereby obtaining a granule, (c) treating the resultant granule from step (b) with air or an inert gas in a vessel of which at least one part rotates around a horizontal axis and wherein said vessel is a paddle mixer, free-fall mixer, or plough share mixer.

2. The process according to claim 1, wherein in step (b), a gas with an inlet temperature of at least 125° C. is used.

3. The process according to claim 1, wherein the weight ratio of chelating agent (A) and (co) polymer (B) is in the range of from 1,000:1 to 7.5:1.

4. The process according to claim 1, wherein step (b) is performed with a two-fluid nozzle.

5. The process according to claim 1, wherein step (c) is performed over a period of 1 minute to 5 hours.

6. The process according to claim 1, wherein step (c) is performed in a free-fall mixer.

7. The process according to claim 1, wherein step (c) is followed by a step (d) including the removal of fines.

8. The process according to claim 1, wherein (co) polymer (B) is selected from copolymers of (meth) acrylic acid and a comonomer bearing at least one sulfonic acid group per molecule.

9. The process according to claim 8, wherein the comonomer bearing at least one sulfonic acid group per molecule is 2-acrylamido-2-methylpropanesulfonic acid.

* * * * *